US012762177B2

(12) United States Patent
Chi et al.

(10) Patent No.: US 12,762,177 B2
(45) Date of Patent: Oct. 13, 2026

(54) METHOD, APPARATUS, DEVICE AND READABLE MEDIUM FOR DATA COMPRESSION AND DECOMPRESSION

(71) Applicant: Beijing Youzhuju Network Technology Co., Ltd., Beijing (CN)

(72) Inventors: Lu Chi, Beijing (CN); Zehuan Yuan, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/041,964

(22) Filed: Jan. 30, 2025

(65) Prior Publication Data

US 2025/0252130 A1 Aug. 7, 2025

(30) Foreign Application Priority Data

Feb. 1, 2024 (CN) ......................... 202410141190.2

(51) Int. Cl.

*G06F 16/00* (2019.01)
*G06F 16/41* (2019.01)
*G06F 40/40* (2020.01)

(52) U.S. Cl.

CPC .............. *G06F 16/41* (2019.01); *G06F 40/40* (2020.01)

(58) Field of Classification Search

CPC ................................. G06F 16/00; G06F 16/41
See application file for complete search history.

(56) References Cited

U.S. PATENT DOCUMENTS

| | | | |
|---|---|---|---|
| 2018/0026649 A1 | 1/2018 | Harik | |
| 2022/0327288 A1 | 10/2022 | Van Durme et al. | |
| 2023/0237278 A1 | 7/2023 | Yuan et al. | |
| 2023/0341950 A1 | 10/2023 | Margot et al. | |
| 2024/0184763 A1* | 6/2024 | Li | G06F 16/2282 |
| 2024/0386885 A1* | 11/2024 | Tadmor | G10L 15/02 |

FOREIGN PATENT DOCUMENTS

| | | |
|---|---|---|
| CN | 108874754 A | 11/2018 |
| CN | 110532466 A | 12/2019 |
| CN | 111868753 A | 10/2020 |

(Continued)

OTHER PUBLICATIONS

China Patent Application No. 202410141190.2; Office Action; dated Nov. 28, 2025; 14 pages.

(Continued)

*Primary Examiner* — Cheryl Lewis
(74) *Attorney, Agent, or Firm* — BakerHostetler

(57) ABSTRACT

Embodiments of the disclosure provide a method, an apparatus, a device and a readable medium for data compression and decompression. A method for data compression includes: generating a first input sequence for a first target model based on a first prompt and target data to be compressed, the first target model being constructed based on a language model, the first prompt indicating the first target model to perform a data compression task; obtaining a first output sequence of the first target model by providing the first input sequence to the first target model; and extracting a compressed representation of the target data from the first output sequence, the compressed representation being a vectorized representation of the target data.

20 Claims, 5 Drawing Sheets

(56) References Cited

FOREIGN PATENT DOCUMENTS

| | | | |
|---|---|---|---|
| CN | 114861910 | A | 8/2022 |
| CN | 116521893 | A | 8/2023 |
| CN | 117079671 | A | 11/2023 |
| CN | 117271780 | A | 12/2023 |
| WO | WO2020057492 | A1 | 3/2020 |

OTHER PUBLICATIONS

China Patent Application No. 202410141190.2; Notification to Grant; dated May 28, 2026; 6 pages.
China Patent Application No. 202410141190.2; Second Office Action; Mar. 23, 2026; 8 pages.
Yifan Wang; "Research on Sentence Compression Algorithm Based on Deep Learning"; Beijing University of Posts and Telecommunications; Master Thesis; Jun. 4, 2020; 72 pages (English Abstract on pp. 7 and 8).

* cited by examiner

METHOD, APPARATUS, DEVICE AND READABLE MEDIUM FOR DATA COMPRESSION AND DECOMPRESSION

CROSS REFERENCE

The application claims priority to Chinese Patent Application No. 202410141190.2, filed on Feb. 1, 2024, and entitled "METHOD, APPARATUS, DEVICE AND READABLE MEDIUM FOR DATA COMPRESSION AND DECOMPRESSION", the entirety of which is incorporated herein by reference.

FIELD

Example embodiments of the present disclosure generally relate to the field of computers, and in particular, to a method, an apparatus, a device and a computer-readable storage medium for data compression and decompression.

BACKGROUND

With the rapid development of information technology, the data compression technology (which may also be referred to as the information compression technology) relates to all aspects of life and industry, and brings many conveniences to people. The data compression technology is a technology for improving storage efficiency and transmission speed by reducing the size of data. Data compression and decompression are important in many application scenarios.

SUMMARY

In a first aspect of the present disclosure, a method for data compression is provided. The method includes: generating a first input sequence for a first target model based on a first prompt and target data to be compressed, the first target model being constructed based on a language model, the first prompt indicating the first target model to perform a data compression task; obtaining a first output sequence of the first target model by providing the first input sequence to the first target model; and extracting a compressed representation of the target data from the first output sequence, the compressed representation being a vectorized representation of the target data.

In a second aspect of the present disclosure, a method for data decompression is provided. The method includes: obtaining a compressed representation of target data, the compressed representation being a vectorized representation of the target data; generating a second input sequence for a second target model based on a second prompt and the compressed representation, the second target model being constructed based on a language model, the second prompt indicating the second target model to perform a data decompression task; obtaining a second output sequence of the second target model by providing the second input sequence to the second target model; and determining, from the second output sequence, the decompressed target data.

In a third aspect of the present disclosure, an apparatus for data compression is provided. The apparatus includes: a first input generating module configured to generate a first input sequence for a first target model based on a first prompt and target data to be compressed, the first target model being constructed based on a language model, the first prompt indicating the first target model to perform a data compression task; a first output obtaining module configured to obtain a first output sequence of the first target model by providing the first input sequence to the first target model; and a compressed representation extracting module configured to extract a compressed representation of the target data from the first output sequence, the compressed representation being a vectorized representation of the target data.

In a fourth aspect of the present disclosure, an apparatus for data decompression is provided. The apparatus includes: a compressed representation obtaining module configured to obtain a compressed representation of target data, the compressed representation being a vectorized representation of the target data; a second input generating module configured to generate a second input sequence for a second target model based on a second prompt and the compressed representation, the second target model being constructed based on a language model, the second prompt indicating the second target model to perform a data decompression task; a second output obtaining module configured to obtain a second output sequence of the second target model by providing the second input sequence to the second target model; and a target data determining module configured to determine, from the second output sequence, the decompressed target data.

In a fifth aspect of the present disclosure, an electronic device is provided. The device includes at least one processing unit; and at least one memory coupled to the at least one processing unit and storing instructions executable by the at least one processing unit. The instructions, when executed by the at least one processing unit, cause the device to perform the method of the first aspect or the method of the second aspect.

In a sixth aspect of the present disclosure, a computer-readable storage medium is provided. The computer-readable storage medium has a computer program stored thereon, and the computer program is executable by a processor to implement the method of the first aspect or the method of the second aspect.

It should be understood that the content described in the Summary section is not intended to identify key features or essential features of the embodiments of the present disclosure, nor is it intended to limit the scope of the present disclosure. Other features of the present disclosure will become readily apparent from the following description.

BRIEF DESCRIPTION OF THE DRAWINGS

In the following, the above and other features, advantages and aspects of various implementations of the present disclosure will become more apparent in conjunction with the drawings and with reference to the following detailed description. In the drawings, same or similar reference numerals denote same or similar elements, where.

DETAILED DESCRIPTION

Figure 1:
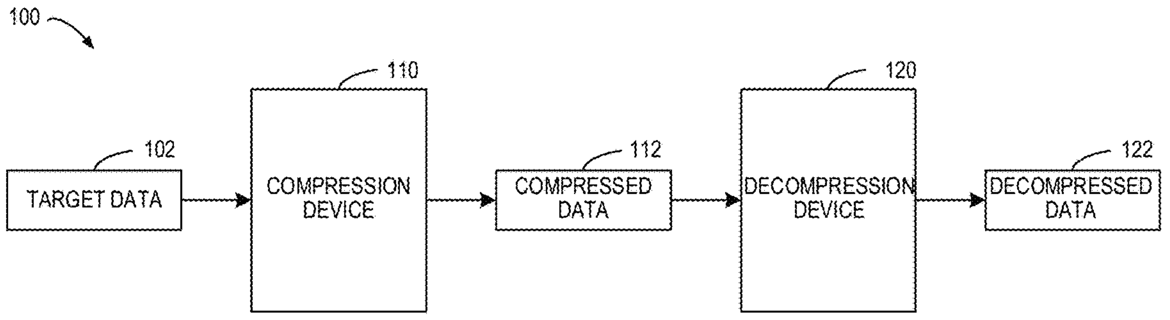
FIG. 1 illustrates a schematic diagram of an example environment in which embodiments of the present disclosure can be implemented.

The embodiments of the present disclosure will be described in more detail below with reference to the drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and the embodiments of the present disclosure are only for illustrative purposes, and are not intended to limit the protection scope of the present disclosure.

In the description of the embodiments of the present disclosure, the term "comprise/include" and similar terms should be understood as open inclusion, that is, "comprise/include but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may be included below.

Herein, unless explicitly stated, performing a step "in response to A" does not mean that the step is performed immediately after "A", but may include one or more intermediate steps.

It can be understood that the data involved in the technical solutions of the present disclosure (including but not limited to the data itself, the acquisition, use, storage or deletion of the data) should comply with the requirements of corresponding laws, regulations and related provisions.

It can be understood that before using the technical solutions disclosed in the embodiments of the present disclosure, relevant users should be informed of the type, use scope, use scenarios, etc. of the information involved in the present disclosure in an appropriate way according to relevant laws and regulations, and the authorization of the relevant users should be obtained, where the relevant users may include any type of rights subject, such as individuals, enterprises, groups, etc.

For example, when in response to receiving an active request from a user, prompt information is sent to the relevant user to explicitly prompt the relevant user that the operation requested to be performed will require the acquisition and use of information of the relevant user, so that the relevant user can independently choose whether to provide information to a software or hardware such as an electronic device, an application, a server or a storage medium that performs the operation of the technical solution of the present disclosure according to the prompt information.

As an optional but non-limiting implementation, in response to receiving the active request from the relevant user, the prompt information may be sent to the relevant user in the form of, for example, a pop-up window, and the prompt information may be presented in the form of text in the pop-up window. In addition, the pop-up window may also carry a selection control for the user to choose whether to "agree" or "disagree" to provide information to the electronic device.

It can be understood that the above process of notifying and obtaining the user's authorization is only illustrative and does not limit the implementations of the present disclosure, and other methods that satisfy relevant laws and regulations may also be applied to the implementations of the present disclosure. The activation of the digital assistant-related functions, the acquired data, the processing and storage of data, etc. in the embodiments of the present disclosure should be pre-authorized by the user and other rights subjects associated with the user, and should comply with the agreements of relevant laws, regulations and rules of agreements between rights subjects.

As used herein, the term "model" can learn the association relationship between corresponding input and output from training data, and thus corresponding output can be generated for a given input after the training is completed. The generation of the model can be based on machine learning technology. Deep learning is a machine learning algorithm that processes input and provides corresponding output by using multiple layers of processing units. A neural network model is an example of a model based on deep learning. As used herein, the term "model" may also be referred to as a "machine learning model", a "learning model", a "machine learning network" or a "learning network", which are used interchangeably herein.

FIG. 1 illustrates a schematic diagram of an example environment 100 in which embodiments of the present disclosure can be implemented. The environment 100 involves a compression device 110 and a decompression device 120.

In the environment 100, in a data compression stage, target data 102 to be compressed is provided to the compression device 110. The compression device 110 can perform a data compression task on the target data 102 using any suitable data compression manner to generate compressed data 112. In a data decompression stage, the compressed data 112 is provided to the decompression device 120. The decompression device 120 can also perform a data decompression task on the compressed data 112 using any suitable data decompression manner to generate decompressed data 122. The decompressed data 122 is data obtained after the target data 102 is compressed and decompressed. A difference between the decompressed data 122 and the target data 102 should be smaller than a difference threshold. In an ideal state, the decompressed data 122 should be the same as the target data 102 or the error is within an acceptable range.

In some application scenarios, the compression device 110 and the decompression device 120 may be different devices. For example, the compression device 110 can be used to generate the compressed data 112 and send the compressed data 112 to the decompression device 120. The decompression device 120 is used to receive the compressed data 112 and perform data decompression on the compressed data 112 to generate the decompressed data 122. In some application scenarios, the compression device 110 and the decompression device 120 may also be the same device. In this case, the device may, for example, perform data decompression on the compressed data 112 stored locally.

The compression device 110 and the decompression device 120 may be any type of device with computing power, including a terminal device or a server-side device. The terminal device may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/video camera, a positioning device, a television receiver, a radio broadcast receiver, an e-book device, a game device, or any combination of the foregoing, including accessories and peripherals of these devices or any combination thereof. The server-side device, for example, may include a computing system/server, such as a mainframe, an edge computing node, a computing device in a cloud environment, and the like.

It should be understood that the structure and function of the environment 100 are described for the purpose of example only, without implying any limitation to the scope of the present disclosure.

As mentioned above, the data compression technology is widely used. The information compression technology is divided into two categories: lossy compression and lossless compression. The lossless compression (such as ZIP) can completely restore the original data, and is often used in fields that need to maintain data integrity (such as text file compression). The lossy compression (such as JPEG) will delete parts of some data to obtain a higher compression rate, which can be used for images and audio and video. Due to the limited perception of people, the parts deleted in the lossy compression generally do not significantly affect the perception effect. The core idea of information compression is to remove redundancy in data, which can greatly enhance the utilization efficiency of storage and transmission resources. Traditionally, data compression algorithms are usually used to implement data compression. The data compression algorithms may include, for example, Huffman encoding, dictionary encoding, transform encoding, quantization, and the like.

With the rapid development of artificial intelligence, the application of a language model (LM) is also becoming more and more widely used. The language model is an important model in a natural language processing scenario. Traditionally, the language model is usually used to implement a session system between people and machines and between machines and machines. It is expected that the language model can be combined with the data compression technology, that is, it is expected that data compression and decompression can be implemented with the aid of the language model.

In view of this, embodiments of the present disclosure provide an improved method for data compression and decompression. A method for data compression includes: generating a first input sequence for a first target model based on a first prompt and target data to be compressed, the first target model being constructed based on a language model, the first prompt indicating the first target model to perform a data compression task; obtaining a first output sequence of the first target model by providing the first input sequence to the first target model; and extracting a compressed representation of the target data from the first output sequence, the compressed representation being a vectorized representation of the target data.

A method for data decompression includes: obtaining a compressed representation of target data, the compressed representation being a vectorized representation of the target data; generating a second input sequence for a second target model based on a second prompt and the compressed representation, the second target model being constructed based on a language model, the second prompt indicating the second target model to perform a data decompression task; obtaining a second output sequence of the second target model by providing the second input sequence to the second target model; and determining, from the second output sequence, the decompressed target data.

In this way, data compression and data decompression can be implemented by inputting respective prompts to the language model and with the aid of the language model. Data compression and data decompression can be conveniently and quickly implemented while the quality of data compression and data decompression is improved.

Some example embodiments of the present disclosure will be described below with continued reference to the drawings.

In the embodiments of the present disclosure, the compression device generates the first input sequence for the first target model based on the first prompt and the target data to be compressed. The compression device obtains the first output sequence of the first target model by providing the first input sequence to the first target model. The compression device extracts the compressed representation of the target data from the first output sequence, the compressed representation being the vectorized representation of the target data. The first target model may be a model constructed based on the language model. The language model here may include LM, large language model (LLM), etc. The target data to be compressed may be data of any modality. For example, the target data may include data of any modality such as text, image, video, audio, etc.

Figure 2:
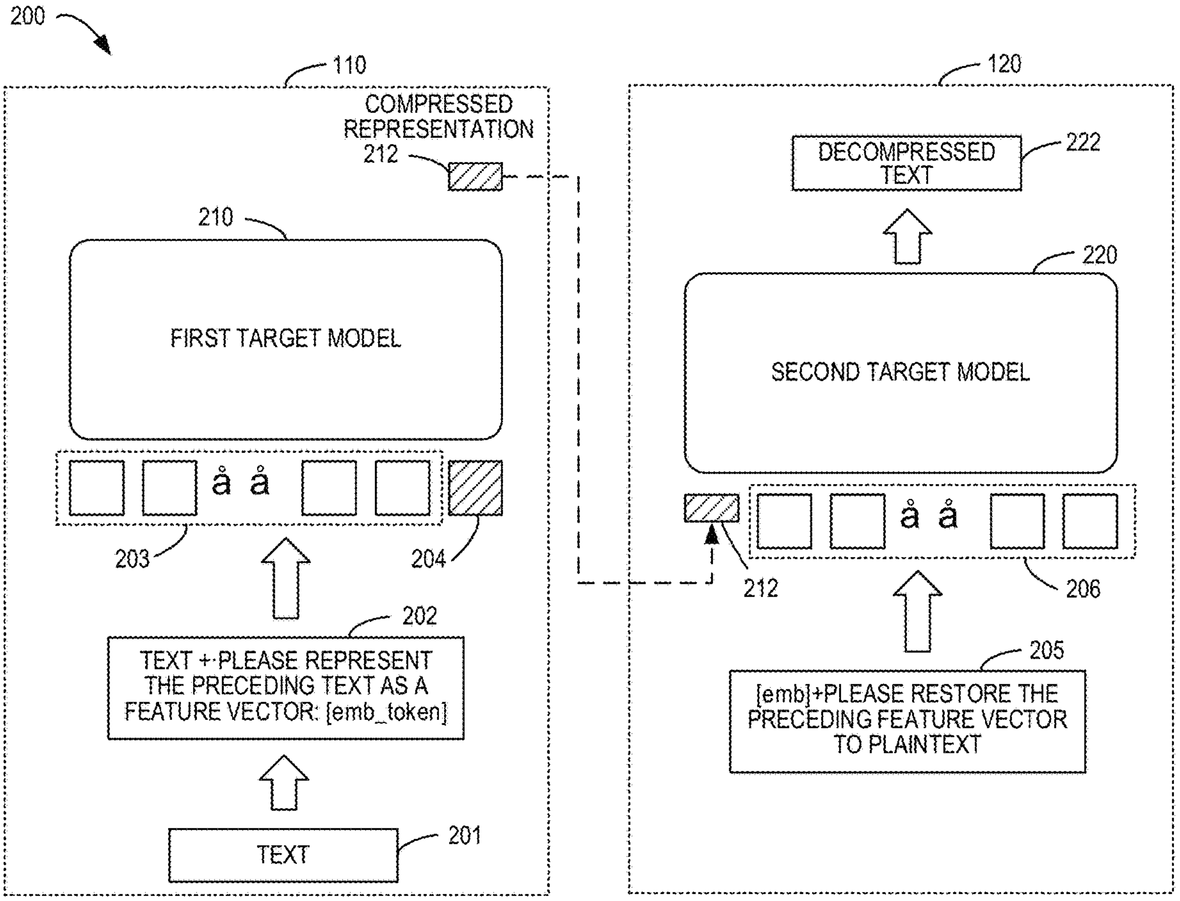
FIG. 2 illustrates a schematic diagram of an example framework for data compression and decompression according to some embodiments of the present disclosure.

Reference is made to FIG. 2 below, taking the target data including data in a text modality as an example for example description. FIG. 2 illustrates a schematic diagram of an example framework 200 for data compression and decompression according to some embodiments of the present disclosure. The example framework 200 includes the compression device 110 and the decompression device 120.

In some embodiments of the present disclosure, both the compression device 110 and the decompression device 120 may implement data compression and data decompression with the aid of a model. The model may be a model installed locally on the compression device 110 or the decompression device 120, or may be a model installed on other devices (for example, installed in a remote device). The model that the compression device 110 uses and the model that the decompression device 120 uses may be models of the same type but with different functions (for example, both are CNN), or may be models of different types.

As shown in FIG. 2, the compression device 110 may perform a data compression task with the aid of a first target model 210, and the decompression device 120 may perform a data decompression task with the aid of a second target model 220. Both the first target model 210 and the second target model 220 may be models constructed based on the language model.

As shown in FIG. 2, the compression device 110 may obtain target data to be compressed (for example, a text 201) and the first prompt. The first prompt may be, for example, "Please represent the preceding text as a feature vector: [emb_token]". The compression device 110 may generate a first input sequence 202 for the first target model 210 based on the first prompt and the target data to be compressed. The first input sequence 202 is provided to the first target model 210.

The first prompt indicates the first target model to perform the data compression task. For example, the first prompt may be "Please represent the preceding data as a feature vector". In some embodiments, the first prompt may further indicate a type of the target data, and/or a modality of the target data. For example, if the target data is data in a text modality, the first prompt may be "Please represent the preceding text as a feature vector", where "text" indicates that the modality of the target data is the text modality. For another example, if the target data is data in an image modality, the first prompt may further be "Please represent the preceding visual information as a feature vector", where "visual information" indicates that the modality of the target data is the image modality. For another example, the first prompt may further be "Please represent the preceding news summary (or article title) as a feature vector", where "news summary (or article title)" indicates the type of the target data. In this way, by clearly indicating the type of data to be compressed in the first prompt, the first target model can be guided to better understand the modality and semantics of the data to be compressed, thereby generating a more accurate vectorized feature representation of the data to be compressed as the compressed representation.

In some embodiments, due to the attention mechanism of the language model on the first input sequence, the latter part of the sequence will be focused on the former part of the sequence, but the former part of the sequence will not be focused on the latter part of the sequence. Therefore, in the first input sequence, the target data to be compressed may be located before the first prompt. For example, the first input sequence may be in the form of "target data to be compressed+first prompt". In this way, by placing the data to be compressed in front of the prompt, the speech model can better focus on the data to be compressed.

In some embodiments, the first input sequence may further include a predetermined symbol corresponding to the compressed representation of the target data. This predetermined symbol may be any appropriate symbol. This predetermined symbol may be pre-configured by relevant users, or may be determined by the compression device itself. For example, the predetermined symbol may be a symbol "[emb_token]". This predetermined symbol may be a symbol included in the first prompt. In this case, the first prompt may be, for example, "Please represent the preceding sentence as a feature vector: [emb_token]", and the first input sequence may be, for example, "Text to be compressed+Please represent the preceding sentence as a feature vector: [emb_token]". This predetermined symbol may also be a symbol directly included in the first input sequence. In this case, the first input sequence may be, for example, "Target data to be compressed+first prompt+[emb_token]". It can be found that whether the predetermined symbol is included in the first prompt or the first input sequence, the predetermined symbol is fixed at the end of the first input sequence. The compression device may extract the compressed representation of the target data from a position corresponding to the predetermined symbol in the first output sequence, for example. For example, the compression device may take the feature corresponding to the position of [emb_token] as the compressed representation. That is, the compression device extracts the compressed representation of the target data from the end of the first output sequence.

In some embodiments, at the first target model 210, the first target model 210 may perform vectorization (Tokenization) on the first input sequence 202 to obtain a vectorization result. As shown in FIG. 2, the first target model 210 may perform vectorization on the first input sequence 202 to obtain a vectorization result 203 of the text (including the text 201 and the first prompt) and a vectorization result 204 of the predetermined symbol. The first target model 210 may generate the first output sequence based on the vectorization result, for example. The first output sequence may be, for example, "Feature vector: emb", where "emb" here is the compressed representation of the target data (for example, the text 201).

The compression device 110 may obtain the first output sequence from the first target model 210, and extract a compressed representation 212 of the text 201 from the first output sequence. For example, the compression device 110 may extract the compressed representation 212 from a position (that is, the end) corresponding to the predetermined symbol "[emb_token]" in the first output sequence. The compressed representation 212 is a vectorized representation of the target data 102.

The vectorized representation output by the first target model usually has a predetermined dimension. In some embodiments, in the data compression task, the first target model may be configured to output a single vectorized representation by default, as the compressed representation of the target data. In some embodiments, in order to flexibly compress larger target data (such as a video, a long text, or a high-definition image, etc.), the first prompt may further indicate a number of vectorized representations of the predetermined dimension to be output. In this case, if the number may be any positive integer, the compressed representation may include a vectorized representation of at least one predetermined dimension. For example, if a video is to be compressed into K vectorized representations (that is, the number of vectorized representations of the predetermined dimension is K), the first prompt may be constructed as "Please represent the preceding video visual information as feature vectors: [emb_token1], [emb_token2], . . . , [emb_tokenK]". Correspondingly, K compressed representations may be extracted from K positions corresponding to K [emb_token] in the first output sequence. It can be understood that the larger the K, the smaller the compression ratio, and when K is 1, the compression ratio is the largest. In this way, the number of compressed representations included in the final compression result may be defined, and a flexible and definable compression ratio in the data compression process may be achieved.

The compressed representation 212 for the target data may be stored and transmitted. When decompression is required, the compressed representation 212 may be provided to the decompression device 220. The decompression device 220 may further obtain a second prompt. The second prompt may be, for example, "Please restore the preceding feature vector to plaintext". The decompression device 220 may generate a second input sequence 205 for the second target model 220 based on the second prompt and the compressed representation 212. The second input sequence 205 is provided to the second target model 220.

In the embodiments of the present disclosure, the decompression device obtains the compressed representation of the target data, the compressed representation being the vectorized representation of the target data. For example, the decompression device may obtain the compressed representation of the target data provided by the compression device. The decompression device generates the second input sequence for the second target model based on the second prompt and the compressed representation. The decompression device obtains the second output sequence of the second target model by providing the second input sequence to the second target model, and determines the decompressed target data from the second output sequence. The second target model may also be a model constructed based on the language model. The language model here may include LM, large language model (LLM), etc. It should be noted that although the first target model and the second target model may be models of the same type, the model parameters of the two may be the same or different because they perform different tasks. The decompressed target data may also be data of any modality, and the modality of all data in the target data is the same. For example, the target data may include data of any modality such as a text, an image, a video, an audio, etc.

Similarly to the first prompt, the second prompt indicates the second target model to perform the data decompression task. In some embodiments, the second prompt may further indicate a type of the target data to be decompressed, and/or a modality of the target data to be decompressed. For example, the second prompt may be "Please restore the preceding feature vector to text", "Please restore the preceding feature vector to an image", "Please restore the preceding feature vector to a video", etc., where "text", "image" and "video" indicate that the modality of the target data is the text modality, the image modality and the video modality, respectively. For another example, the second prompt may further be "Please restore the preceding feature vector to news summary (or article title)", where "news summary (or article title)" indicates the type of the target data to be decompressed. In this way, by clearly indicating the type of data to be compressed in the second prompt, the second target model can be guided to better understand the modality and semantics of the target data to be compressed, so that the target data can be more accurately decompressed from the compressed representation.

In some embodiments, due to the attention mechanism of the language model on the second input sequence, the latter part of the sequence will be focused on the former part of the sequence, but the former part of the sequence will not be focused on the latter part of the sequence. Therefore, in the second input sequence, the compressed representation may be located before the second prompt. For example, the second input sequence may be in the form of "compressed representation+second prompt". In this way, by placing the compressed representation to be decompressed in front of the prompt, the model can better focus on the compressed representation to be decompressed.

In some embodiments, at the second target model 220, the second target model 220 may perform vectorization on the second input sequence 205 to obtain a vectorization result. Since the compressed representation 212 itself is the vectorized representation of the target data 102, the second target model 220 may not perform vectorization processing on the compressed representation 212. As shown in FIG. 2, the second target model 220 may perform vectorization on the second prompt in the second input sequence 205 to obtain a vectorization result 206. The second target model 220 may generate the second output sequence based on the compressed representation 212 and the vectorization result 206, for example. The second output sequence may be, for example, "Plaintext is as follows: XXXX", where "XXXX" may be the decompressed text 222, for example.

The decompression device 120 may obtain the second output sequence from the second target model 220, and extract the decompressed text 222 from the second output sequence. For example, the decompression device 120 may also extract the decompressed text 222 from the end of the second output sequence.

In some embodiments, the first target model 210 and the second target model 220 may be jointly trained. The first target model 210 and the second target model 220 may, for example, be deployed in the same electronic device for training, and after the training is completed, the first target model 210 and the second target model 220 are respectively deployed in the compression device 110 and the decompression device 120 to perform the data compression task and the data decompression task.

The first target model 210 and the second target model 220 may be performed by a supervised fine-tuning (SFT) method, so as to continuously reduce or minimize the error between the training text as the model input and the decompressed text output by the model. In the training stage of the first target model 210 and the second target model 220, a difference between the training text to be compressed and the decompressed training text may be obtained. The first target model 210 and the second target model 220 may be trained by reducing this difference. In response to this difference being less than a predetermined threshold, it is determined that the similarity between the training text to be compressed and the decompressed text is relatively high, and then it is determined that the training of the first target model 210 and the second target model 220 is completed. It can be understood that after the training is completed, the model parameters of the first target model 210 and the second target model 220 are fixed. After the training is completed, the difference between the training text to be compressed and the decompressed text should be small enough.

The above describes an example where the target data includes data in a text modality, and an example where the target data includes data in a non-text modality (such as an image modality, a video modality, an audio modality, etc.) will be described below. In some embodiments, in response to that the target data includes data in a non-text modality, the compression device may use a feature encoder corresponding to the modality of the target data to encode at least one feature representation from the target data. The compression device may then generate the first input sequence for the first target model based on the at least one feature representation and the first prompt.

Correspondingly, in response to that the target data includes data in a non-text modality, the decompression device may extract a decompressed feature representation of the target data from the second output sequence. The decompression device may then use a feature decoder corresponding to the modality of the target data to decode the target data from the decompressed feature representation.

Figure 3:
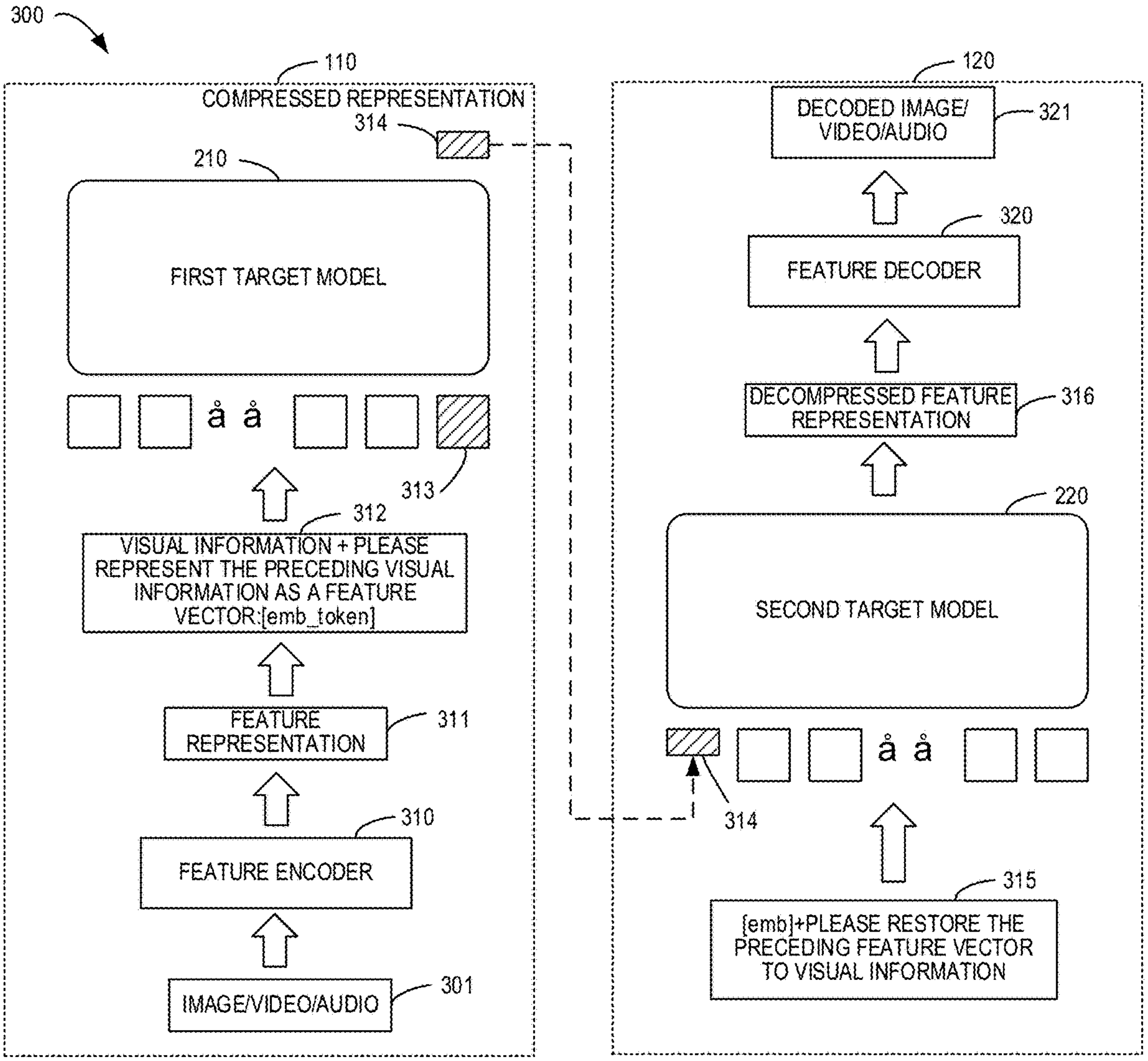
FIG. 3 illustrates a schematic diagram of an example framework for data compression and decompression according to some other embodiments of the present disclosure.

An example where the target data includes data in an image modality will be described below with reference to FIG. 3. FIG. 3 illustrates a schematic diagram of an example framework 300 for data compression and decompression according to some other embodiments of the present disclosure. The example framework 300 also includes the compression device 110 and the decompression device 120. The compression device 110 and the decompression device 120 may also perform a data compression task and a data decompression task with the aid of the first target model 210 and the second target model 220, respectively.

As shown in FIG. 3, the compression device 110 may obtain target data to be compressed (for example, an image 301) and the first prompt. The first prompt may be, for example, "Please represent the preceding visual information as a feature vector". Since the first target model 110 is a model constructed based on the language model, it cannot directly process the target data 301 (such as an image, a video, or an audio, etc.) in a non-text modality. The compression device 110 may provide the target data 301 in a non-text modality to a trained feature encoder 310, and obtain a feature representation 311 with the aid of the feature encoder 310. For example, if the modality of the target data 301 is an image modality or a video modality, the corresponding feature encoder 310 may be an image encoder. For the target data 301 in the video modality, the image encoder can extract feature representations of respective video frames of the video. The feature encoder 310 may be, for example, a Visual Transformer (ViT). The feature representation 311 includes at least one image feature representation (for example, may include 196 image feature representations output by the ViT). If the modality of the target data is an audio modality, the corresponding feature encoder may be an audio encoder.

The compression device 110 may generate a first input sequence 312 for the first target model 210 based on the first prompt and the feature representation 311. The first input sequence 312 is provided to the first target model 210. Similar to the text, at the first target model 210, the first target model 210 may perform vectorization on the first input sequence 212 to obtain a vectorization result. In the vectorization result, a vectorization result 313 of the predetermined symbol is located at the end. The first target model 210 may generate the first output sequence based on the vectorization result, for example. The first output sequence may be, for example, "Feature vector: emb", where "emb" here is the compressed representation of the target data 301.

The compression device 110 may obtain the first output sequence from the first target model 210, and extract a compressed representation 314 of the target data 301 in a non-text modality from the first output sequence. For example, the compression device 110 may extract the compressed representation 314 from a position (that is, the end) corresponding to the predetermined symbol "[emb_token]" in the first input sequence 312 in the first output sequence. The compressed representation 314 is a vectorized representation of the feature representation 311. The compressed representation 314 is provided to the decompression device 220. The decompression device 220 may further obtain a second prompt. The second prompt may be, for example, "Please restore the preceding feature vector to visual information". The decompression device 220 may generate a second input sequence 315 for the second target model 220 based on the second prompt and the compressed representation 314. The second input sequence 315 is provided to the second target model 220.

In some embodiments, at the second target model 220, the second target model 220 may perform vectorization on the second input sequence 315 to obtain a vectorization result. Since the compressed representation 314 itself is a vectorized representation, the second target model 220 may not perform vectorization processing on the compressed representation 314. As shown in FIG. 3, the second target model 220 may perform vectorization on the second prompt in the second input sequence 315 to obtain a vectorization result. The second target model 220 may generate the second output sequence based on the compressed representation 212 and the vectorization result, for example. The second output sequence may be, for example, "Visual information is as follows: XXXX", where "XXXX" may be the decompressed feature representation 316, for example. The decompressed feature representation 316 may include at least one image feature representation.

The decompression device 120 may obtain the second output sequence from the second target model 220, and extract the decompressed feature representation 316 from the second output sequence. For example, the decompression device 120 may also extract the decompressed feature representation 316 from the end of the second output sequence. The decompression device 120 may provide the decompressed feature representation 316 to a trained feature decoder 320. The decompression device 120 may use the feature decoder 320 to decode to obtain decoded target data 321 (for example, a decoded image, a decoded video, or a decoded audio, etc.) from the decompressed feature representation 316. The selection of the feature decoder 320 is related to the modality of the target data to be decompressed. For example, if the modality of the target data 301 is an image modality or a video modality, the corresponding feature decoder 320 may be an image decoder. If the modality of the target data 301 is an audio modality, the corresponding feature decoder may be an audio decoder.

In the training stage of the first target model 210 and the second target model 220, the training may be performed by continuously reducing or minimizing the difference between the feature representation before compression and the feature representation after decompression. By reducing this difference, it can be determined that the similarity between the feature representation 311 to be compressed and the decompressed feature representation 316 is relatively high, and then it is determined that the training of the first target model 210 and the second target model 220 is completed. In some embodiments, since the feature encoder 310 and the feature decoder 320 are both trained encoders and decoders. In the training process, the first target model 210 and the second target model 220 may also be trained by reducing or minimizing the difference between the training data to be compressed and the compressed target data (fixing the parameters of the feature encoder 310 and the feature decoder 320 in this process). When this difference is small or minimized, it can be determined that the similarity between the data to be compressed and the decoded data is relatively high, and then it is determined that the training of the first target model 210 and the second target model 220 is completed. In this way, when the training is completed, the difference between the feature representation to be compressed and the decompressed feature representation should be small enough, and the difference between the input data and the output data is also small enough.

In summary, in the embodiments of the present disclosure, data compression and data decompression can be implemented by inputting respective prompts to the language model and with the aid of the language model. Data compression and data decompression can be conveniently and quickly implemented while the quality of data compression and data decompression is improved.

Figure 4:
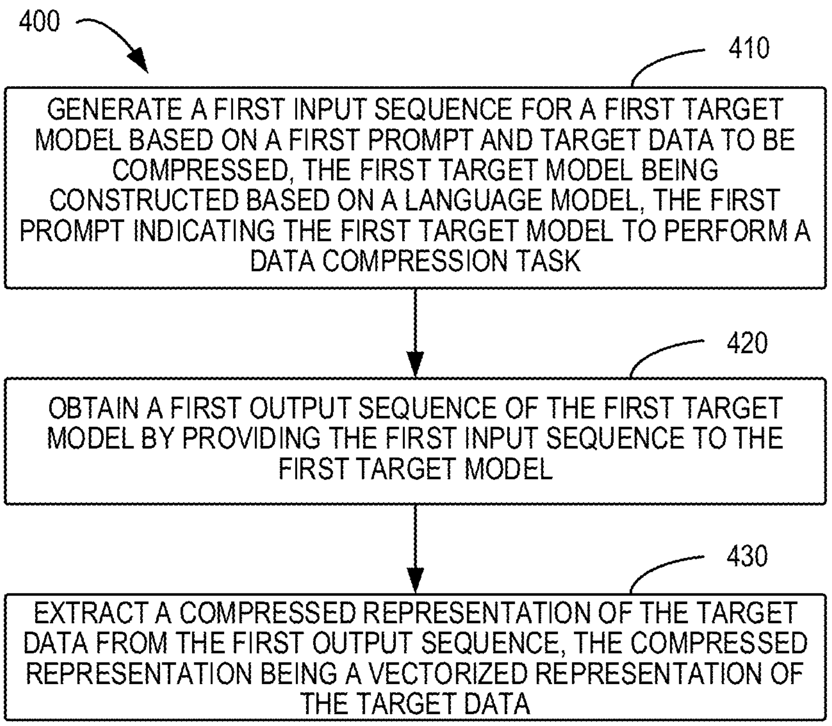
FIG. 4 illustrates a flowchart of a process for data compression according to some embodiments of the present disclosure.

FIG. 4 illustrates a flowchart of a process 400 for data compression according to some embodiments of the present disclosure. The process 400 may be implemented at the compression device 110. The process 400 will be described below with reference to FIG. 1.

At block 410, the compression device 110 generates a first input sequence for a first target model based on a first prompt and target data to be compressed, the first target model being constructed based on a language model, the first prompt indicating the first target model to perform a data compression task.

At block 420, the compression device 110 obtains a first output sequence of the first target model by providing the first input sequence to the first target model.

At block 430, the compression device 110 extracts a compressed representation of the target data from the first output sequence, the compressed representation being a vectorized representation of the target data.

In some embodiments, the first prompt further indicates at least one of: a type of the target data, or a modality of the target data.

In some embodiments, in the first input sequence, the target data is located before the first prompt.

In some embodiments, the first input sequence further includes a predetermined symbol corresponding to the compressed representation of the target data, and where extracting the compressed representation of the target data from the first output sequence includes: extracting the compressed representation of the target data from a position corresponding to the predetermined symbol in the first output sequence.

In some embodiments, the target data includes one of: text, an image, a video, or an audio.

In some embodiments, the target data includes data in a non-text modality, and generating the first input sequence for the first target model includes: encoding, using a feature encoder corresponding to the modality of the target data, at least one feature representation from the target data; and generating the first input sequence for the first target model based on the at least one feature representation and the first prompt.

In some embodiments, the compressed representation includes a vectorized representation of at least one predetermined dimension, and where the first prompt indicates a number of vectorized representations of the predetermined dimension to be output.

Figure 5:
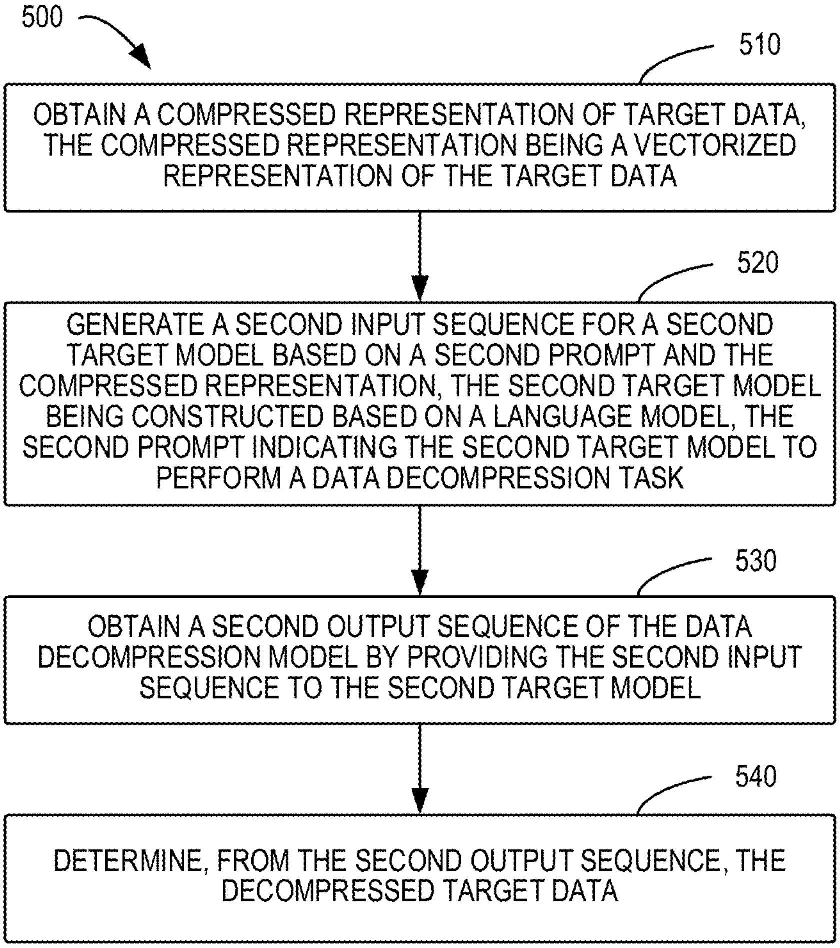
FIG. 5 illustrates a flowchart of a process for data decompression according to some embodiments of the present disclosure.

FIG. 5 illustrates a flowchart of a process 500 for data decompression according to some embodiments of the present disclosure. The process 500 may be implemented at the decompression device 120. The process 500 will be described below with reference to FIG. 1.

At block 510, the decompression device 120 obtains the compressed representation of the target data, the compressed representation being a vectorized representation of the target data.

At block 520, the decompression device 120 generates the second input sequence for the second target model based on the second prompt and the compressed representation, the second target model being constructed based on a language model, the second prompt indicating the second target model to perform the data decompression task.

At block 530, the decompression device 120 obtains the second output sequence of the second target model by providing the second input sequence to the second target model.

At block 540, the decompression device 120 determines, from the second output sequence, the decompressed target data.

In some embodiments, the second prompt further indicates at least one of: a type of the target data to be decompressed, or a modality of the target data to be decompressed.

In some embodiments, in the second input sequence, the compressed representation is located before the second prompt.

In some embodiments, the target data includes one of: text, an image, a video, or an audio.

In some embodiments, the target data includes data in a non-text modality, and determining, from the second output sequence, the decompressed target data includes: extracting, from the second output sequence, a decompressed feature representation of the target data; and decoding, using a feature decoder corresponding to the modality of the target data, the target data from the decompressed feature representation.

The embodiments of the present disclosure also provide corresponding apparatuses for implementing the above methods or processes.

Figure 6:
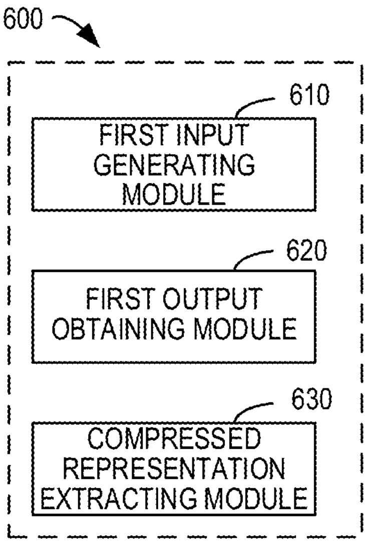
FIG. 6 illustrates a schematic structural block diagram of an apparatus for data compression according to some embodiments of the present disclosure.

FIG. 6 illustrates a schematic structural block diagram of an apparatus 600 for data compression according to some embodiments of the present disclosure. The apparatus 600 may be implemented as or included in the compression device 110. Modules/components in the apparatus 600 may be implemented by hardware, software, firmware, or any combination thereof.

As shown in FIG. 6, the apparatus 600 includes a first input generating module 610 configured to generate a first input sequence for a first target model based on a first prompt and target data to be compressed, the first target model being constructed based on a language model, the first prompt indicating the first target model to perform a data compression task. The apparatus 600 also includes a first output obtaining module 620 configured to obtain a first output sequence of the first target model by providing the first input sequence to the first target model. The apparatus 600 also includes a compressed representation extracting module 630 configured to extract a compressed representation of the target data from the first output sequence, the compressed representation being a vectorized representation of the target data.

In some embodiments, the first prompt further indicates at least one of: a type of the target data, or a modality of the target data.

In some embodiments, in the first input sequence, the target data is located before the first prompt.

In some embodiments, the first input sequence further includes a predetermined symbol corresponding to the compressed representation of the target data, and the compressed representation extraction module 630 may be specifically configured to: extract the compressed representation of the target data from a position corresponding to the predetermined symbol in the first output sequence.

In some embodiments, the target data includes one of: text, an image, a video, or an audio.

In some embodiments, the target data includes data in a non-text modality, and the first input generating module 610 includes: an encoding module configured to encode, using a feature encoder corresponding to the modality of the target data, at least one feature representation from the target data; and a generating module configured to generate the first input sequence for the first target model based on the at least one feature representation and the first prompt.

In some embodiments, the compressed representation includes a vectorized representation of at least one predetermined dimension, and where the first prompt indicates a number of vectorized representations of the predetermined dimension to be output.

Figure 7:
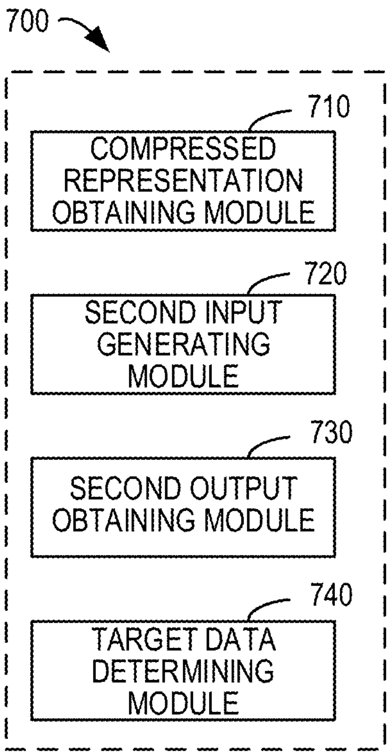
FIG. 7 illustrates a schematic structural block diagram of an apparatus for data decompression according to some embodiments of the present disclosure.

FIG. 7 illustrates a schematic structural block diagram of an apparatus 700 for data decompression according to some embodiments of the present disclosure. The apparatus 700 may be implemented as or included in the decompression device 120. Modules/components in the apparatus 700 may be implemented by hardware, software, firmware, or any combination thereof.

As shown in FIG. 7, the apparatus 700 includes a compressed representation obtaining module 710 configured to obtain a compressed representation of target data, the compressed representation being a vectorized representation of the target data. The apparatus 700 also includes a second input generating module 720 configured to generate a second input sequence for a second target model based on a second prompt and the compressed representation, the second target model being constructed based on a language model, the second prompt indicating the second target model to perform a data decompression task. The apparatus 700 also includes a second output obtaining module 730 configured to obtain a second output sequence of the second target model by providing the second input sequence to the second target model. The apparatus 700 also includes a target data determining module 740 configured to determine, from the second output sequence, the decompressed target data.

In some embodiments, the second prompt further indicates at least one of: a type of the target data to be decompressed, or a modality of the target data to be decompressed.

In some embodiments, in the second input sequence, the compressed representation is located before the second prompt.

In some embodiments, the target data includes one of: text, an image, a video, or an audio.

In some embodiments, the target data includes data in a non-text modality, and the target data determining module 740 includes: an extracting module configured to extract, from the second output sequence, a decompressed feature representation of the target data; and a decoding module configured to decode, using a feature decoder corresponding to the modality of the target data, the target data from the decompressed feature representation.

The units and/or modules included in the apparatus 600 and the apparatus 700 may be implemented in various ways, including software, hardware, firmware, or any combination thereof. In some embodiments, one or more units and/or modules may be implemented using software and/or firmware, such as machine executable instructions stored on a storage medium. In addition to or instead of the machine executable instructions, some or all of the units and/or modules in these apparatuses may be implemented at least in part by one or more hardware logic components. As an example, rather than a limitation, example types of hardware logic components that may be used include a field programmable gate array (FPGA), an application specific integrated circuit (ASIC), an application specific standard product (ASSP), a system on chip (SOC), a complex programmable logic device (CPLD), and the like.

Figure 8:
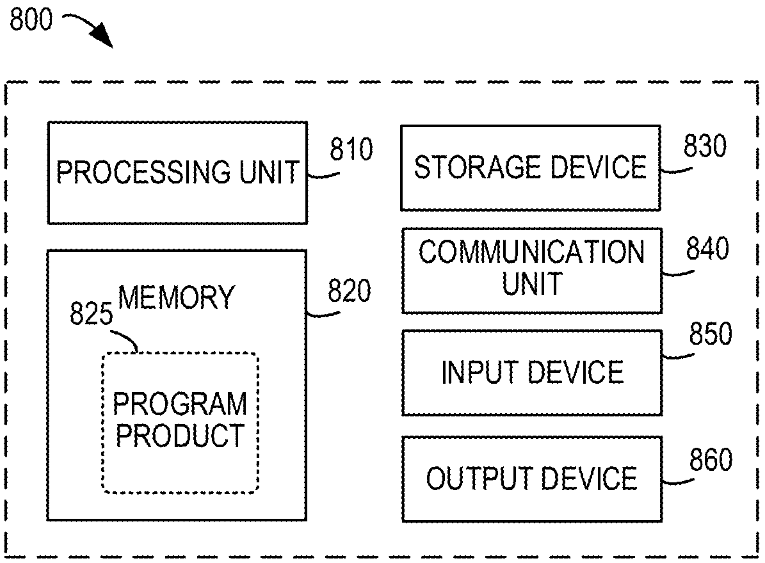
FIG. 8 illustrates a block diagram of an electronic device in which one or more embodiments of the present disclosure can be implemented.

FIG. 8 illustrates a block diagram of an electronic device 800 in which one or more embodiments of the present disclosure can be implemented. It should be understood that the electronic device 800 shown in FIG. 8 is only example, and should not constitute any limitation to the function and scope of the embodiments described herein. The electronic device 800 shown in FIG. 8 may be used to implement the compression device 110 and/or the decompression device 120 of FIG. 1.

As shown in FIG. 8, the electronic device 800 is in the form of a general-purpose electronic device. The components of the electronic device 800 may include, but are not limited to, one or more processors or processing units 810, a memory 820, a storage device 830, one or more communication units 840, one or more input devices 850, and one or more output devices 860. The processing unit 810 may be an actual or virtual processor and may perform various processes according to a program stored in the memory 820. In a multi-processor system, multiple processing units execute computer executable instructions in parallel to improve the parallel processing capability of the electronic device 800.

The electronic device 800 generally includes multiple computer storage media. Such media may be any available media accessible by the electronic device 800, including but not limited to volatile and non-volatile media, and removable and non-removable media. The memory 820 may be a volatile memory (e.g., a register, a cache, a random-access memory (RAM)), a non-volatile memory (e.g., a read-only memory (ROM), an electrically erasable programmable read-only memory (EEPROM), a flash memory), or a combination thereof. The storage device 830 may be a removable or non-removable medium, and may include a machine-readable medium, such as a flash drive, a magnetic disk, or any other medium, which may be used to store information and/or data and may be accessed within the electronic device 800.

The electronic device 800 may further include additional removable/non-removable, volatile/non-volatile storage media. Although not shown in FIG. 8, a disk drive for reading from or writing to a removable, non-volatile disk (e.g., a "floppy disk"), and an optical disk drive for reading from or writing to a removable, non-volatile optical disk may be provided. In these cases, each drive may be connected to a bus (not shown) by one or more data media interfaces. The memory 820 may include a computer program product 825 having one or more program modules configured to perform various methods or acts of various embodiments of the present disclosure.

The communication unit 840 implements communication with other electronic devices through communication media. Additionally, the functions of components of the electronic device 800 may be implemented by a single computing cluster or multiple computing machines that may communicate through communication connections. Therefore, the electronic device 800 may operate in a networked environment using a logical connection with one or more other servers, a network personal computer (PC), or another network node.

The input device 850 may be one or more input devices, such as a mouse, a keyboard, a trackball, or the like. The output device 860 may be one or more output devices, such as a display, a speaker, a printer, or the like. The electronic device 800 may also communicate with one or more external devices (not shown) such as storage devices, display devices, etc., with one or more devices that enable a user to interact with the electronic device 800, or with any devices (e.g., a network card, a modem, etc.) that enable the electronic device 800 to communicate with one or more other electronic devices, if required, through the communication unit 840. Such communication may be performed via an input/output (I/O) interface (not shown).

According to an example implementation of the present disclosure, a computer-readable storage medium having computer-executable instructions stored thereon is provided, where the computer-executable instructions are executed by a processor to implement the methods described above. According to an example implementation of the present disclosure, a computer program product is also provided, where the computer program product is tangibly stored on a non-transitory computer-readable medium and includes computer-executable instructions, and the computer-executable instructions are executed by a processor to implement the methods described above.

Various aspects of the present disclosure are described herein with reference to the flowcharts and/or block diagrams of the methods, apparatuses, devices and computer program products implemented according to the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or other programmable data processing apparatus, so as to produce a machine, such that the instructions, when executed by the processing unit of the computer or other programmable data processing apparatus, produce an apparatus that implements the functions/acts specified in one or more blocks of the flowcharts and/or block diagrams. These computer-readable program instructions may also be stored in a computer-readable storage medium, and these instructions cause a computer, a programmable data processing apparatus and/or other devices to work in a specific way. Therefore, the computer-readable medium having the instructions stored thereon includes a product, which includes instructions for implementing various aspects of the functions/acts specified in one or more blocks of the flowcharts and/or block diagrams.

The computer-readable program instructions may be loaded onto a computer, other programmable data processing apparatuses, or other devices, causing a series of operational steps to be performed on the computer, the other programmable data processing apparatuses, or the other devices to produce a computer-implemented process, such that the instructions performed on the computer, the other programmable data processing apparatuses, or the other devices implement the functions/acts specified in one or more blocks in the flowcharts and/or block diagrams.

The flowcharts and block diagrams in the drawings show architectures, functions and operations of possible implementations of the system, method and computer program product according to various implementations of the present disclosure. In this regard, each block in the flowcharts or block diagrams may represent a module, a program segment, or a part of instructions, and the module, the program segment, or the part of instructions contain one or more executable instructions for implementing specified logical functions. In some alternative implementations, the functions marked in the blocks may also occur in a different order than the order marked in the drawings. For example, two consecutive blocks may actually be executed substantially in parallel, and sometimes they may be executed in a reverse order, depending on the functions involved. It should also be noted that each block in the block diagrams and/or flowcharts, and a combination of blocks in the block diagrams and/or flowcharts, may be implemented by a dedicated hardware-based system that performs specified functions or actions, or may be implemented by a combination of dedicated hardware and computer instructions.

Various implementations of the present disclosure have been described above, and the above description is illustrative, not exhaustive, and is not limited to the disclosed implementations. Many modifications and changes are obvious to ordinary technical personnel in this technical field without departing from the scope and spirit of the described implementations. The selection of terms used in this paper is intended to best explain the principles, practical applications, or improvements to the technology in the market of various implementations, or to enable other ordinary technical personnel in this technical field to understand various implementations disclosed herein.

What is claimed is:

1. A method for data compression, comprising:

generating a first input sequence for a first model based on a first prompt and data to be compressed, wherein the first model is constructed based on a language model, and wherein the first prompt indicates a data compression task to be performed by the first model;

obtaining a first output sequence of the first model by providing the first input sequence to the first model;

extracting a compressed representation of the data from the first output sequence, the compressed representation being a vectorized representation of the data; and decompressing the compressed representation of the data by a second model that is constructed based on the language model and that is jointly trained with the first model.

2. The method according to claim 1, wherein the first prompt further indicates at least one of: a type of the data, or a modality of the data.

3. The method according to claim 1, wherein in the first input sequence, the data is located before the first prompt.

4. The method according to claim 1, wherein the first input sequence further comprises a predetermined symbol corresponding to the compressed representation of the data, and wherein extracting the compressed representation of the data from the first output sequence comprises:

extracting the compressed representation of the data from a position corresponding to the predetermined symbol in the first output sequence.

5. The method according to claim 1, wherein the data comprises one of: text, an image, a video, or an audio.

6. The method according to claim 1, wherein the data comprises data in a non-text modality, and generating the first input sequence for the first model comprises:

encoding, using a feature encoder corresponding to the modality of the data, at least one feature representation from the data; and generating the first input sequence for the first model based on the at least one feature representation and the first prompt.

7. The method according to claim 1, wherein the compressed representation comprises a vectorized representation of at least one predetermined dimension, and wherein the first prompt indicates a number of vectorized representations of the predetermined dimension to be output.

8. A method for data decompression, comprising:

obtaining a compressed representation of data, wherein the compressed representation is a vectorized representation of the data generated by a first model configured to perform a data compression task on the data, and wherein the first model is constructed based on a language model;

generating a second input sequence for a second model based on a second prompt and the compressed representation, wherein the second model is constructed based on the language model and is jointly trained with the first model, wherein the second prompt indicates a data compression task to be performed by the second model;

obtaining a second output sequence of the second model by providing the second input sequence to the second model; and determining, from the second output sequence, the decompressed data.

9. The method according to claim 8, wherein the second prompt further indicates at least one of: a type of the data to be decompressed, or a modality of the data to be decompressed.

10. The method according to claim 8, wherein in the second input sequence, the compressed representation is located before the second prompt.

11. The method according to claim 8, wherein the data comprises one of: text, an image, a video, or an audio.

12. The method according to claim 8, wherein the data comprises data in a non-text modality, and determining, from the second output sequence, the decompressed data comprises:

extracting, from the second output sequence, a decompressed feature representation of the data; and decoding, using a feature decoder corresponding to the modality of the data, the data from the decompressed feature representation.

13. An electronic device, comprising:

at least one processing unit; and at least one memory coupled to the at least one processing unit and storing instructions executable by the at least one processing unit, the instructions, when executed by the at least one processing unit, causing the electronic device to perform the method acts comprising:

generating a first input sequence for a first model based on a first prompt and data to be compressed, wherein the first model being is constructed based on a language model, and wherein the first prompt indicates a data compression task to be performed by the first model;

obtaining a first output sequence of the first model by providing the first input sequence to the first model;

extracting a compressed representation of the data from the first output sequence, the compressed representation being a vectorized representation of the data; and decompressing the compressed representation of the data by a second model that is constructed based on the language model and that is jointly trained with the first model.

14. The electronic device according to claim 13, wherein the first prompt further indicates at least one of: a type of the data, or a modality of the data.

15. The electronic device according to claim 13, wherein in the first input sequence, the data is located before the first prompt.

16. The electronic device according to claim 13, wherein the first input sequence further comprises a predetermined symbol corresponding to the compressed representation of the data, and wherein extracting the compressed representation of the data from the first output sequence comprises:

extracting the compressed representation of the data from a position corresponding to the predetermined symbol in the first output sequence.

17. The electronic device according to claim 13, wherein the target data comprises one of: text, an image, a video, or an audio.

18. The electronic device according to claim 13, wherein the data comprises data in a non-text modality, and generating the first input sequence for the first model comprises:

encoding, using a feature encoder corresponding to the modality of the data, at least one feature representation from the data; and generating the first input sequence for the first model based on the at least one feature representation and the first prompt.

19. The electronic device according to claim 13, wherein the compressed representation comprises a vectorized representation of at least one predetermined dimension, and wherein the first prompt indicates a number of vectorized representations of the predetermined dimension to be output.

20. The electronic device according to claim 13, wherein the acts further comprise:

obtaining a compressed representation of data, the compressed representation being a vectorized representation of the data;

generating a second input sequence for a second model based on a second prompt and the compressed representation, the second model being constructed based on a language model, the second prompt indicating the second model to perform a data decompression task;

obtaining a second output sequence of the second model by providing the second input sequence to the second model; and determining, from the second output sequence, the decompressed data.

* * * * *